US007475834B2

(12) United States Patent
Huang

(10) Patent No.: US 7,475,834 B2
(45) Date of Patent: Jan. 13, 2009

(54) PISTOL NOZZLE

(76) Inventor: I-Jen Huang, No. 449, Chin Chou Rd., Chi Fong Vill. Wu Fong Hsiang, Taiching (TW)

( * ) Notice: Subject to any disclaimer, the term of this patent is extended or adjusted under 35 U.S.C. 154(b) by 92 days.

(21) Appl. No.: 11/755,743

(22) Filed: May 31, 2007

(65) Prior Publication Data

US 2008/0296408 A1 Dec. 4, 2008

(51) Int. Cl.
*B05B 1/30* (2006.01)
*B05B 7/02* (2006.01)
*B05B 9/01* (2006.01)
*F16K 31/44* (2006.01)

(52) U.S. Cl. .............. 239/582.1; 239/581.1; 239/581.2; 239/526; 239/569; 251/250

(58) Field of Classification Search ................. 239/526, 239/537, 538, 569, 581.1, 581.2, 582.1; 251/250, 251/315.01, 315.06, 315.08, 315.16
See application file for complete search history.

(56) References Cited

U.S. PATENT DOCUMENTS 3,729,170 A * 4/1973 Lewis et al. ............ 251/315.08
5,303,868 A * 4/1994 Kroll .......................... 239/394

* cited by examiner

*Primary Examiner*—Len Tran
*Assistant Examiner*—Ryan Reis
(74) *Attorney, Agent, or Firm*—Leong C. Lei

(57) ABSTRACT

A novel pistol nozzle is provided herein, in which a spherical valve having a through hole is used to control the water flow by the alignment of the through hole to the water channel of the pistol nozzle. The alignment of the spherical valve's through hole is controlled by the interaction of a pinion and a gear when the control lever of the pistol nozzle is grasped, which requires less effort and achieve more precise control to the water flow.

3 Claims, 5 Drawing Sheets

PISTOL NOZZLE

BACKGROUND OF THE INVENTION (a) Technical Field of the Invention

The present invention generally relates to the pistol nozzle of a hose, and more particularly to a pistol nozzle utilizing a spherical valve to control the water flow.

(b) Description of the Prior Art

FIGS. 4 and 5 depict the structure and operation of a conventional pistol nozzle. As illustrated, inside the body 20 of the pistol nozzle, there is a water channel 21 whose intermediate section has a valve 24 permitting or blocking the water to flow through the water channel 21. The valve 24 is an integral part of a shaft 23 whose one end is in direct contact with a control lever 22 of the pistol nozzle, and whose the other end is wound in a helix spring 25. When a user grasps the control lever 22, the control lever 22 pushes the shaft 23 which in turn compresses the helix spring 25 and opens the valve 24 to allow the water to flow through the water channel 21. When the control lever 22 is released, the helix spring 25 restores the shaft 23 and, thereby, the valve 24 to their normally closed locations, which shuts down the water flow.

The valve 24 usually has a sharp contact with the cross-section of the water channel 21, and the contact would soon wear down after a period of usage and under the impact of high-pressured water flow. Also a plug-like shape of the valve 24 helps to accumulate debris and develop incrustation on the valve 24. As a result, water leakage through the valve 24 is not uncommon as the valve 24 cannot provide an air-tight blockade to the water flow. The leakage is a waste of water and is often rather annoying to the user. This leakage problem would trouble the user even more when the pistol nozzle is used to spray a liquid chemical which may be erosive or poisonous.

SUMMARY OF THE INVENTION

The object of the present invention is to provide a novel pistol nozzle to obviate the shortcomings of the conventional pistol nozzle, as well as to provide more precise control of the water how yet with much less effort of the user.

A major aspect of the present invention is that a spherical valve having a through hole is used to control the water how by the alignment of the through hole to the water channel of the pistol nozzle, which could provide air-tight blockade and significantly less wear and tear.

Another aspect of the present invention is that the alignment of the spherical valve's through hole is controlled by the interaction of a pinion and a gear when the control lever of the pistol nozzle is grasped, which requires much less effort of the user and achieves more precise control to the water flow.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
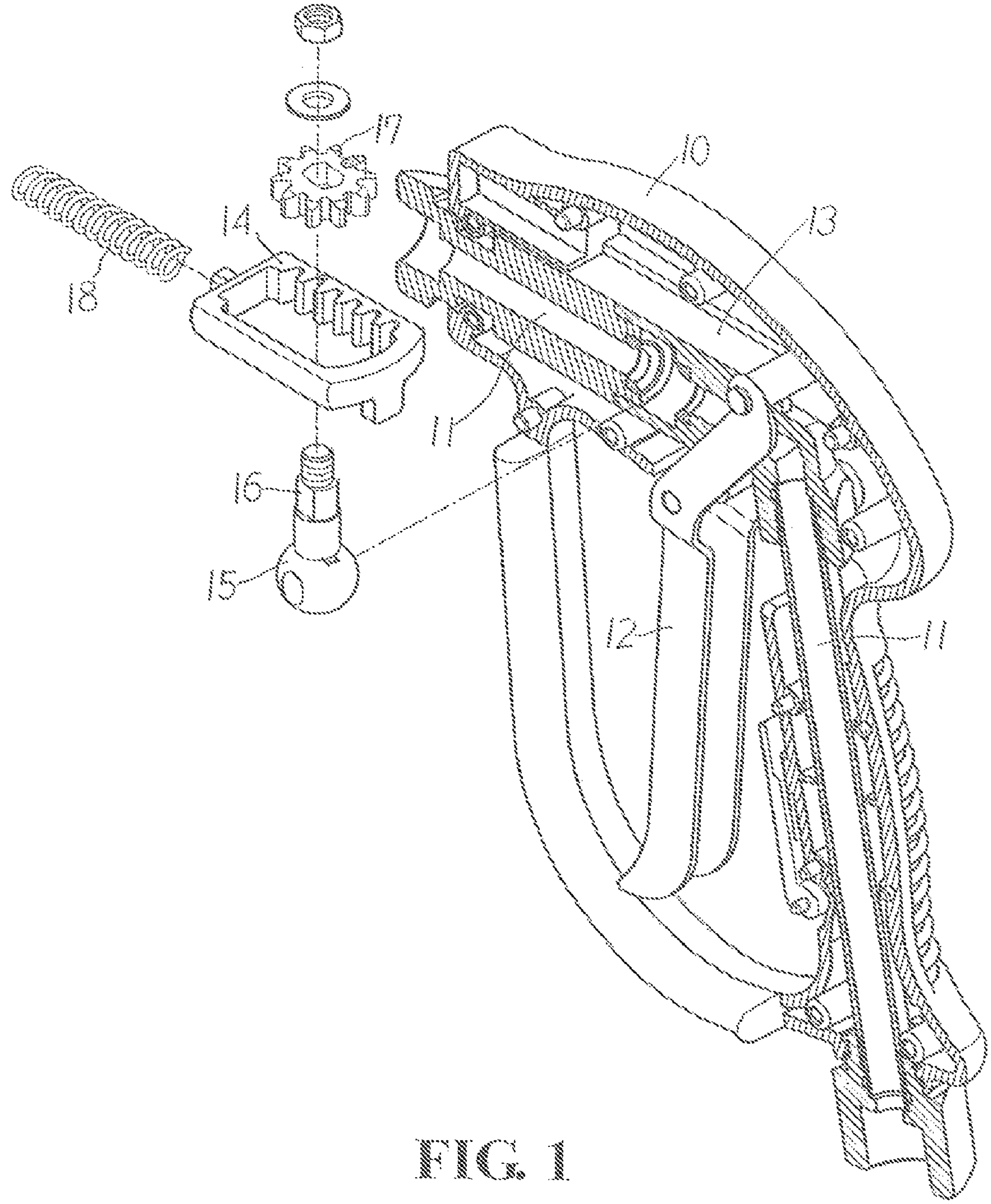
FIG. 1 is a perspective exploded view showing the various components of a pistol nozzle according to an embodiment of the present invention.
Figure 2:
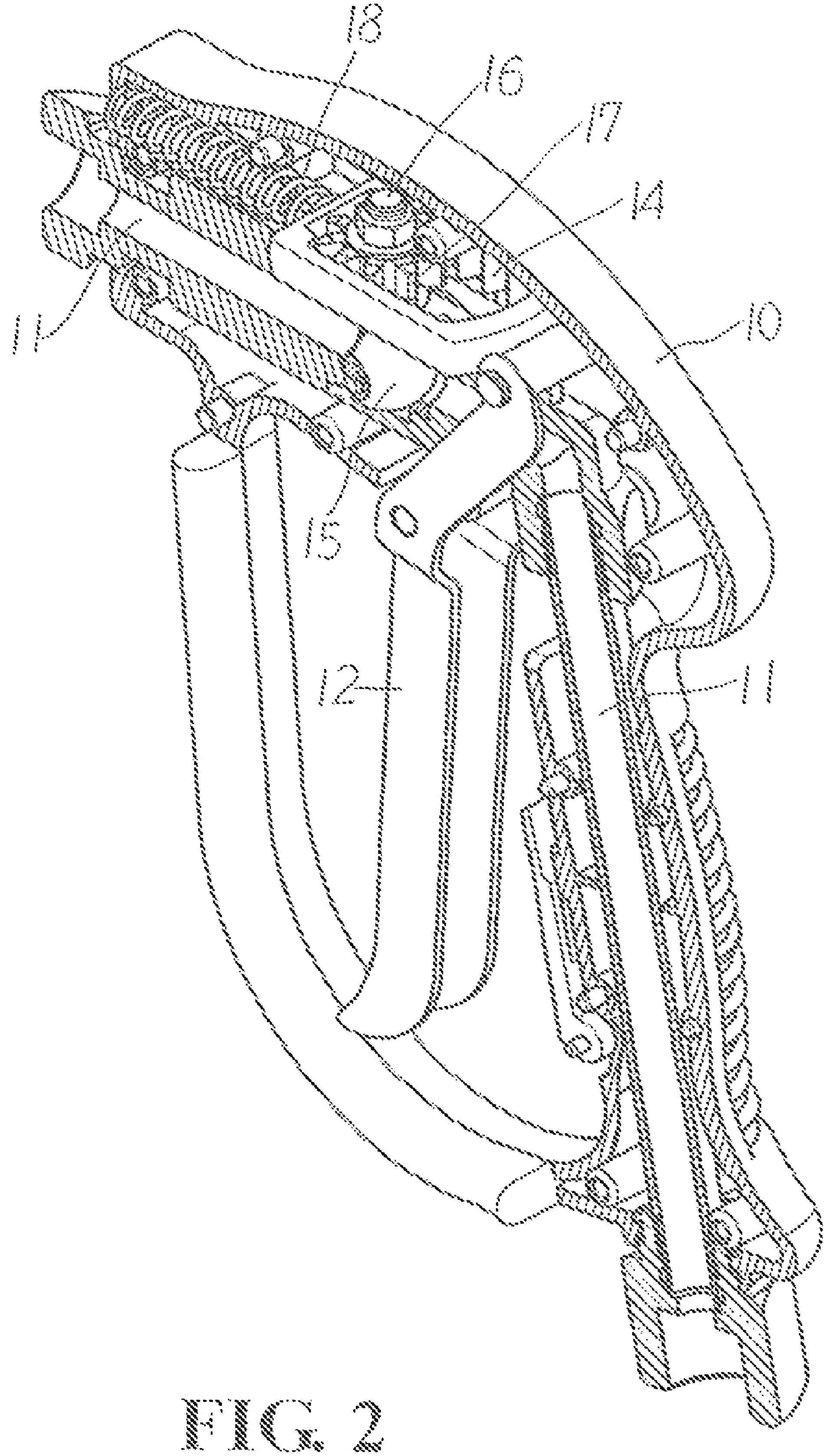
FIG. 2 is a perspective view showing the pistol nozzle of FIG. 1 when the control lever is at its normally closed position.
Figure 3:
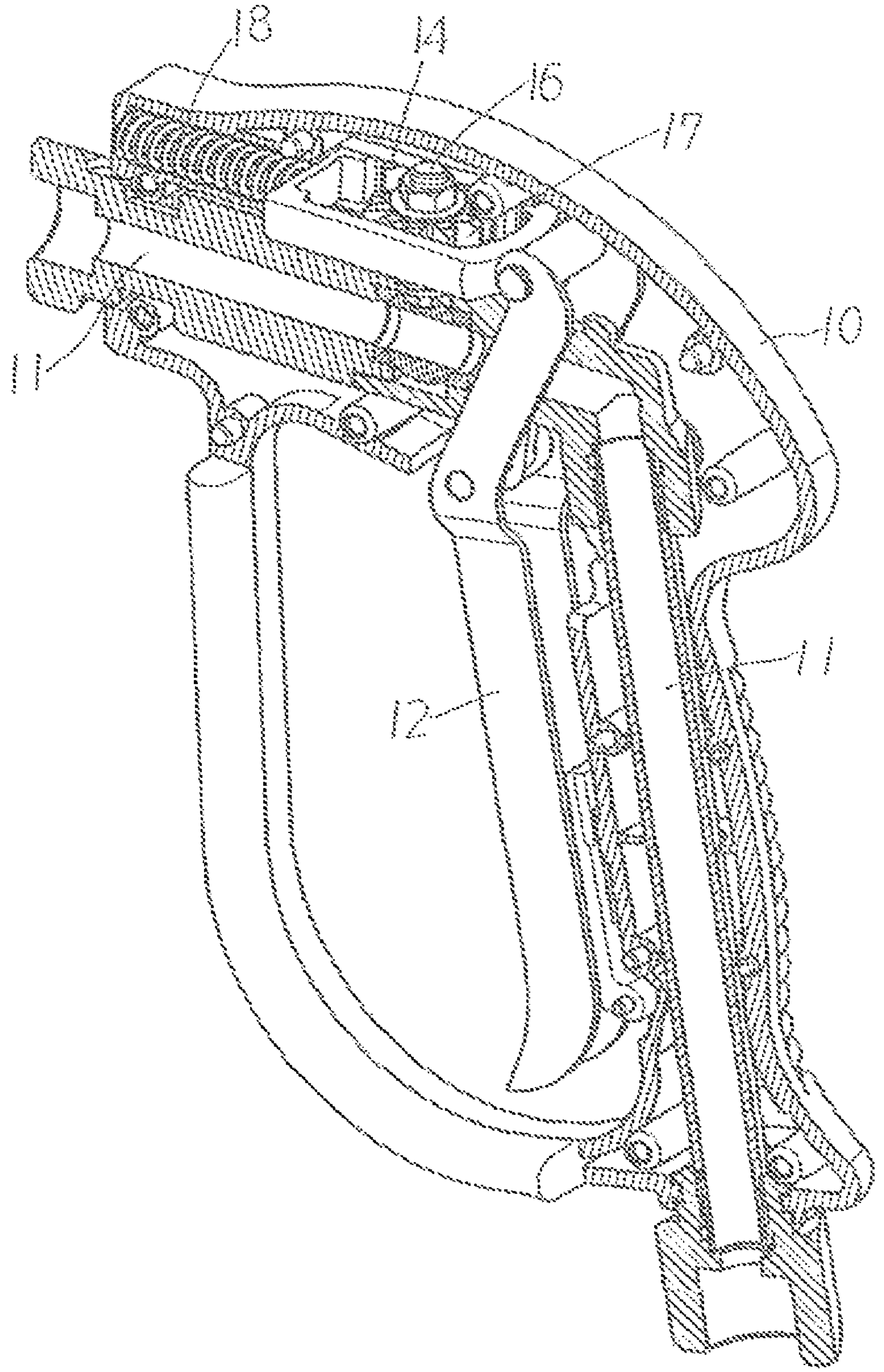
FIG. 3 is a perspective view showing the pistol nozzle of FIG. 1 when the control lever is grasped.
Figure 4:
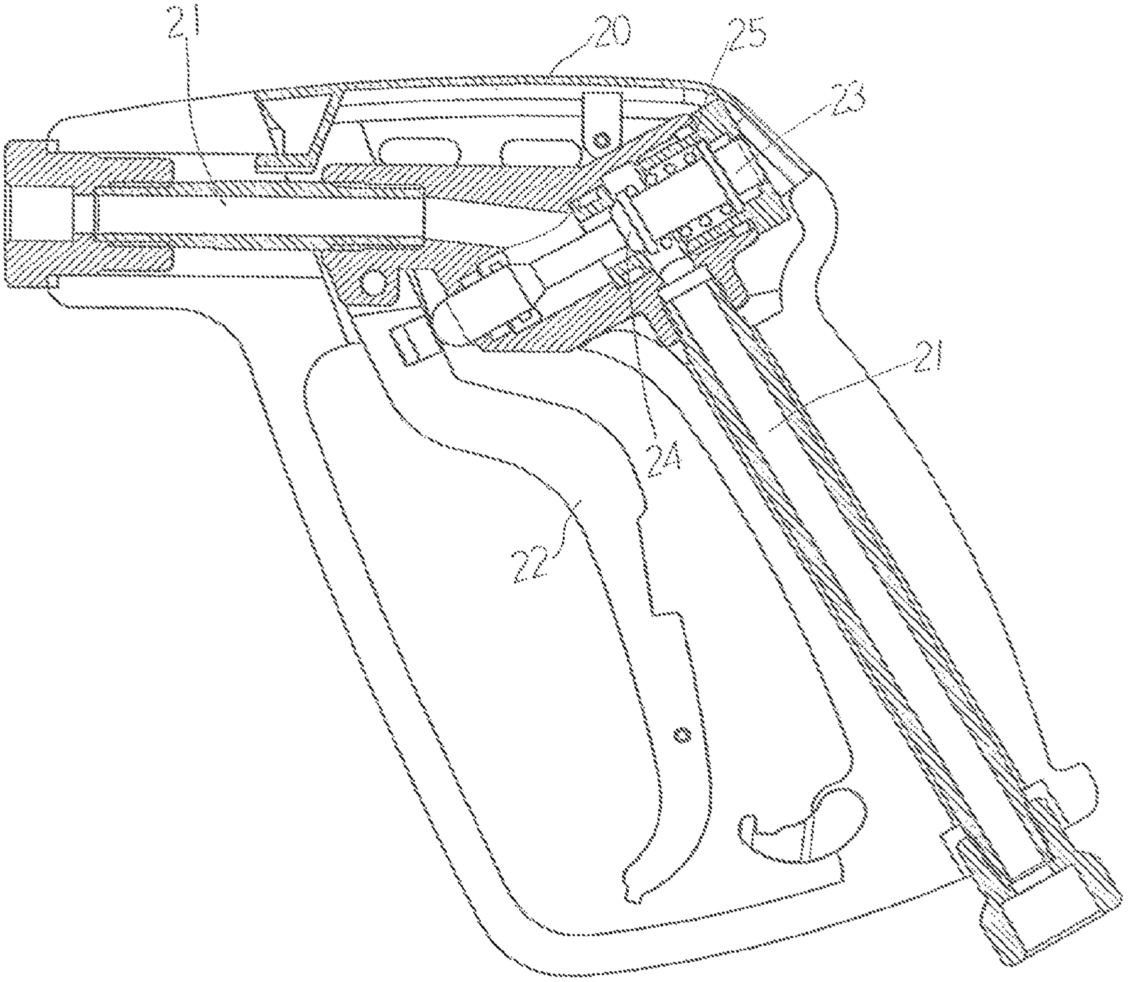
FIG. 4 PRIOR ART
FIG. 4 is a sectional view showing the structure of a conventional pistol nozzle.
Figure 5:
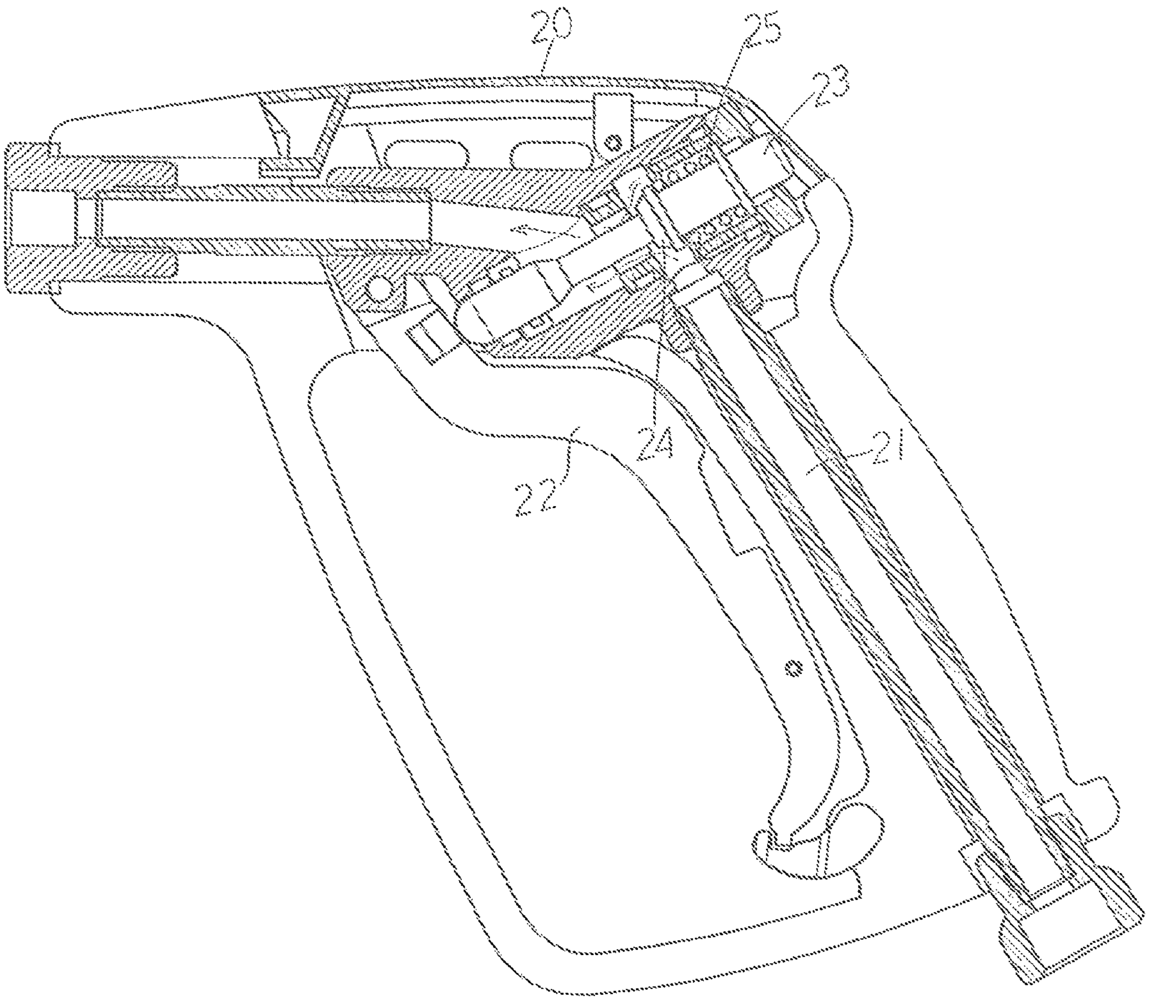
FIG. 5 PRIOR ART
FIG. 5 is a sectional view showing the operation of the conventional pistol nozzle of FIG. 4.

As illustrated in FIGS. 1~3, a pistol nozzle according to an embodiment of the present invention has a hollow body 10 molded into the shape of a pistol barrel. A water channel 11 is configured inside the body 10, whose one end is connected so an end of a hose (not shown) and whose the other end is the nozzle (not numbered) of the pistol nozzle. The water flows in from the hose into the water channel 11, whose flow is controlled by a spherical valve 15 positioned at an appropriate location along the water channel 11. The spherical valve 15 has a through hole (not numbered) so that, when the spherical valve 15 is turned to have its through hole aligned with the water channel 11, the water will flow through the water channel 11 without obstruction. Otherwise, the spherical valve 15 will block the water from flowing through the water channel 11. The spherical valve 15 has a vertical shaft 16 extended from the top of the spherical valve 15 into a gear member 14 configured inside a track 13 in an upper portion of the body 10. The gear member 14 has a hollow body which has a pinion 17 inside whose teeth are embedded into a gear (not numbered) configured along the inner wall of a side of the gear member 14. The shaft 16 is joined to the pinion 17 so that the lateral movement of the gear member 14 along the track 13 would cause the shaft 16, and thereby the spherical valve 15, to spin as the gear drives the teeth of the pinion 17. A control lever 12 is pin-joined to the body 10, and the control lever 12 has a top end positioned at the back (farther away from the nozzle) of the track 13 behind the gear member 14. On the opposite side of the gear member 14, a flexible element 18 is positioned inside the track 13 in front of the gear member 14. The flexible element 18 is usually a helix spring as shown in the diagrams.

When the control lever 12 is grasped toward the body 10, the top end of the control lever 12 pushes the gear member 14 to move toward the nozzle of the body 10 along the track 13. The gear inside the gear member 14 drives the pinion 17 to spin which, in turn, causes the shaft 16 and the spherical valve 15 to spin as well. Depending on the degree of alignment of the through hole of the spherical valve 15 with the water channel 11, a user could control the amount of water flow try adjusting the grasp to the control lever 12. When the water is supplied at the desired amount, the user holds the control lever 12 while the flexible element 18 helps to keep the gear member 14 at its position. When the user releases the control lever 12, the flexible element 18 restores the gear member 14 back to its original location, in which the spherical valve 15 is rotated back to an orientation to block the water flow.

The advantages of the present invention are as follows. First, the use of a spherical valve to control the water flow, and the use of a pinion to control the alignment of the spherical valve provide more precise control over the water flow yet with much less effort. The spherical valve also suffers less wear and tear, increasing the operation life of the pistol nozzle. In addition, the accumulation of debris and incrustation are more difficult to develop as a more fluent water channel is maintained. Further more, the spherical valve and its shaft could be molded into a single object or they could be formed separately. By separating the shaft and the spherical valve, the assembly of the pistol nozzle of the present invention could be greatly simplified.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood trial various omissions, modifications, substitutions and changes in the forms and details of the device illustrated and in its operation can be made by those skilled in the art without departing in any way from the spirit of the present invention.

I claim:

1. A nozzle connected to an end of a hose, comprising:

a body in the shape of a pistol barrel having a water channel configured inside said body whose one end is connected to said end of said hose, a spherical valve positioned at an appropriate location along said water channel, said spherical valve having a through hole and a shaft extended vertically from said spherical valve toward the top of said body;

a gear member configured inside a track in an upper portion of said body, said gear member having a hollow body with a pinion inside whose teeth are embedded into a gear configured along an inner wall of said gear member, said shaft being extended into said gear member and joined to said pinion, a flexible element being positioned inside said track in front of said gear member; and a control lever pin-joined to said body having a top end positioned at the back of said track behind said gear member;

wherein, when said control lever is grasped, said top end of said control lever pushes said gear member to move laterally to the front of said track; said gear inside said gear member drives said pinion to spin which, in turn, causes said shaft and said spherical valve to spin so that said through hole is aligned in various degree to said water channel to allow various amount of the water to flow; when said control lever is released, said flexible element restores said gear member and thereby said through hole of said spherical valve is off alignment with said water channel to block the water flow.

2. The nozzle according to claim 1, wherein said spherical valve and said shaft are separate objects and assembled together.

3. The nozzle according to claim 1, wherein said flexible element is a spring.

* * * * *